(12) United States Patent
Pistemaa et al.

(10) Patent No.: US 7,324,720 B2
(45) Date of Patent: Jan. 29, 2008

(54) PROTECTING OPTICAL COUPLING BETWEEN OPTICAL PORTS ON OPPOSING ELECTRONIC COMPONENTS

(75) Inventors: Jari Pistemaa, Pertteli (FI); Niko Porjo, Turku (FI)

(73) Assignee: Nokia Corporation, Espoo (FI)

( * ) Notice: Subject to any disclaimer, the term of this patent is extended or adjusted under 35 U.S.C. 154(b) by 1 day.

(21) Appl. No.: 11/067,089

(22) Filed: Feb. 25, 2005

(65) Prior Publication Data

US 2006/0193551 A1    Aug. 31, 2006

(51) Int. Cl.
G02B 6/12 (2006.01)

(52) U.S. Cl. .......................................... 385/15; 385/14

(58) Field of Classification Search .................. 385/15, 385/94

See application file for complete search history.

(56) References Cited

U.S. PATENT DOCUMENTS 5,345,527 A * 9/1994 Lebby et al. ............... 385/114
6,739,886 B1 * 5/2004 Robinson et al. ........... 439/133
6,841,799 B2 * 1/2005 Arthur et al. ................ 257/81
2003/0131513 A1 * 7/2003 Runge ......................... 40/718
2004/0061490 A1 * 4/2004 Huber et al. ................ 324/156
2006/0022213 A1 * 2/2006 Posamentier ................ 257/99
2006/0033676 A1 * 2/2006 Faase et al. .................. 345/30

* cited by examiner

Primary Examiner—Tina M. Wong
(74) Attorney, Agent, or Firm—Harrington & Smith, PC

(57) ABSTRACT

In an exemplary aspect of the invention, a method is disclosed for protecting optical coupling between optical ports on opposing electronic components. The method comprises the following. First and second electronic components are oriented, where each of the first and second components has a side comprising an optical port, so that the sides are opposite each other. The first and second electronic components are positioned so as to enable optical coupling between the optical ports. A ring is formed, using at least one material, to surround the optical ports and fill a gap between the sides of the first and second components. The first and second components are mechanically coupled together. In other exemplary aspects, apparatus are disclosed having a ring formed around optical ports (e.g., one or more sets of optical ports) and between sides of electronic components.

29 Claims, 5 Drawing Sheets

US 7,324,720 B2

PROTECTING OPTICAL COUPLING BETWEEN OPTICAL PORTS ON OPPOSING ELECTRONIC COMPONENTS

TECHNICAL FIELD

This invention relates generally to electronics and, more specifically, relates to electronic components having optical ports.

BACKGROUND OF THE INVENTION

Today, electronic components are being put in places where they previously did not exist. For instance, electronic components are being put into such consumer products as refrigerators, dishwashers, and laundry equipment. Not only have electronic components become more prevalent, but the amount they have been assigned to do has increased. Electronics in refrigerators, for example, used to be relegated to controlling temperature and humidity. Now, manufacturers have created refrigerators with consoles that not only control temperature and humidity but that can set up proper conditions inside the refrigerator for particular types of food, keep track of what is currently in stock in the refrigerator and order new supplies for low stock items, and even allow Internet connections.

Another area that has experienced tremendous growth in the use and complexity of electronic components is mobile stations, such as cellular phones, personal digital assistants (PDAs), text messaging devices, and the like. Cellular phones, as an example, used to offer nothing but voice information. Recently, cellular phones have begun to include many other features, such as text messaging, picture taking, transmission, and reception, Internet and email connections, and even video such as television.

These features have caused a corresponding increase in bandwidth operated on by the mobile station. To handle the bandwidth, some mobile stations include optical devices, such as optical fibers, between electronic components in the mobile stations. Optical is chosen because, e.g., of its immunity to electromagnetic interference (EMI), very high bandwidth, and relatively small size. Typically, an optical device on one electronic component will be coupled to another optical device on another electronic component through the use of optical ports. Each optical device has an optical port and communication takes place through the optical ports. The optical ports are typically separated by a gap, such as the gap that exists between the two electronic components.

While optical devices are beneficial, there are certain problems associated therewith.

BRIEF SUMMARY OF THE INVENTION

The present invention provides techniques that protect optical coupling between optical ports on opposing electronic components.

In an exemplary aspect of the invention, a method is disclosed for protecting optical coupling between optical ports on opposing electronic components. The method comprises the following. First and second electronic components are oriented, where each of the first and second components has a side comprising an optical port, so that the sides are opposite each other. The first and second electronic components are positioned so as to enable optical coupling between the optical ports. A ring is formed, using at least one material, to surround the optical ports and fill a gap between the sides of the first and second components. The first and second components are mechanically coupled together.

In another exemplary aspect of the invention, a method is disclosed for protecting optical coupling between optical ports on electronic components. The method comprises the following. First and second electronic components are oriented, wherein each of the first and second electronic components has a side comprising an optical port, so that the sides are opposite each other. The first and second electronic components are positioned, wherein the positioning is performed so that a pad formed to surround the optical port on the first electronic component is positioned to at least partially align with a pad formed to surround the optical port on the second electronic component. At least one material is placed in contact with at least a portion of each of the pads. The at least one material is bonded to the pads.

In another aspect of the invention, an apparatus comprises a first electronic component comprising a first optical port on a first side of the first electronic component. The apparatus further comprises a second electronic component mechanically coupled to the first electronic component and comprising a second optical port on a side of the second electronic component. The sides of the first and second electronic components are opposite each other. The first and second optical ports are able to optically couple. The apparatus also comprises ring between the sides and surrounding the optical ports, where the ring comprises at least one material.

In an additional aspect of the invention, an electronic device comprises a plurality of electronic components. A first of the plurality of electronic components has a side comprising a first optical port. A second of the plurality of electronic components has a side comprising a second optical port. The sides of the first and second electronic components are opposite each other. The first and second optical ports are able to optically couple. The sides of the first and second electronic components are mechanically coupled together. The mobile station also comprises a ring between the sides and surrounding the optical ports, the ring comprising at least one material. The mobile station further comprises a keypad coupled to at least one of the plurality of the electronic components and a screen coupled to at least one of the plurality of the electronic components.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein.

DETAILED DESCRIPTION OF EXEMPLARY EMBODIMENTS

As previously described, electronic components are becoming more prevalent, and increases in bandwidth have meant that some electronic components are using optical devices. Certain of the optical devices have optical ports used to communicate with other optical devices. When a first electronic component is going to be optically coupled to a second electronic component, an optical port on the first electronic component is aligned with an optical port on the second electronic component. For instance, the first electronic component might be an application specific integrated circuit (ASIC) and the second electronic component might be a printed wiring board (PWB). As used herein, an "electronic component" is any component able to perform operations using electrical signals, optical signals, or both.

The ASIC and PWB will be mechanically (e.g., and electrically) coupled together. The mechanical coupling provides a gap between sides of each electronic component (see FIG. 2A, described below). The mechanical coupling is generally performed through such techniques as soldering the ASIC to the PWB in a reflow oven. Mechanical (e.g., an electronic) coupling is generally provided by solder balls in a ball grid array (BGA) design, although other techniques, such as leads in a surface mount design (e.g., a quad flat pack (QFP) design), pins in a though-hole design, and the like.

While these types of couplings for electronic components are beneficial, they also do not provide protection for the optical coupling between the optical ports. In a real user environment, impurities (e.g., dust, dirt, chemicals, moisture, and the like) can find its way between two optical ports and create an effect on the optical coupling. For instance, dust can cause a reduction in optical power coupled between two opposing optical ports. If there are more than one set of optically coupled optical ports, the impurities can cause crosstalk between the sets of optical ports. In the case of a mobile station, these effects can disturb operation of the mobile station. These effects affect the price of the optics needed, needed power levels and manufacturing area air purity requirements (e.g., dust particles on the optical ports can be corrected for by adding power).

By contrast, exemplary embodiments of the present invention protect the optical coupling between optical ports on electrical components. For instance, a ring may be formed that surrounds the optical ports. In another exemplary embodiment, material may be bonded to pads surrounding optical ports on the electronic components. Thus, optical coupling between optical ports may be improved. Additional exemplary embodiments are described below.

Figure 1:
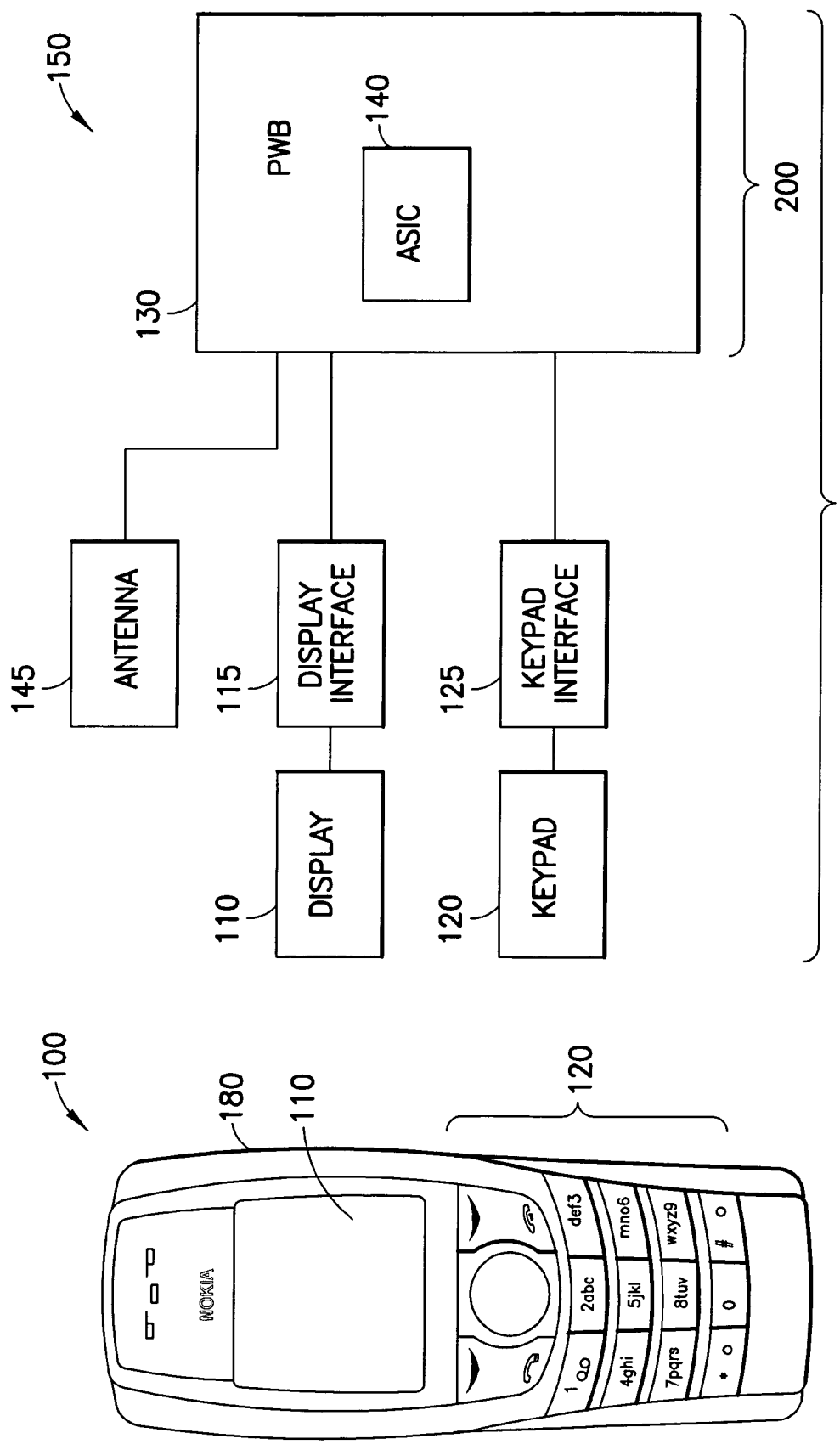
FIG. 1A is an illustration of a mobile station.
FIG. 1B is a block diagram of internals of the mobile station, showing two mechanically coupled electronic components forming an electronic component module.

FIG. 1A is an illustration of a mobile station 100 suitable for use with the present invention. While the present invention may be used with any electronic device using electronic components, such as mobile devices, wired or wireless communication devices, personal digital assistants, portable gaming devices, computer systems, and laptops, mobile stations 100 will mainly be described herein. Mobile station 100 comprises a body 180 that houses a screen 110 and a keypad 120.

FIG. 1B is a block diagram of electronics 150 of the mobile station 100, showing two mechanically coupled electronic components, an ASIC 140 and a PWB 130. In this example, the display interface 115 is coupled to display 110 (see FIG. 1A) and the keypad interface 125 is coupled to the keypad 120. The display interface 115 and the keypad interface 125 communicate with the PWB 130. It should be noted that some implementations could combine the keypad 120 and key pad interface 125 into one physical "keypad." Similarly, the display 110 and the display interface 115 could be combined into one physical "display." In yet other implementations, one or both of the display interface 115 and the keypad interface 125 could be incorporated as part of the ASIC 140 and/or PWB 130, or as additional electronic components on the PWB 130. Antenna 145 is also coupled to the PWB 130. The PWB 130 is mechanically (e.g., and electrically) coupled to the ASIC 140, as shown in more detail in FIG. 2A, to form an electronic component module 200. Typically, reception, for instance of video, over antenna 145 is what uses optical devices in the PWB 130 and ASIC 140. FIGS. 1A and 1B are merely exemplary.

Figure 2:
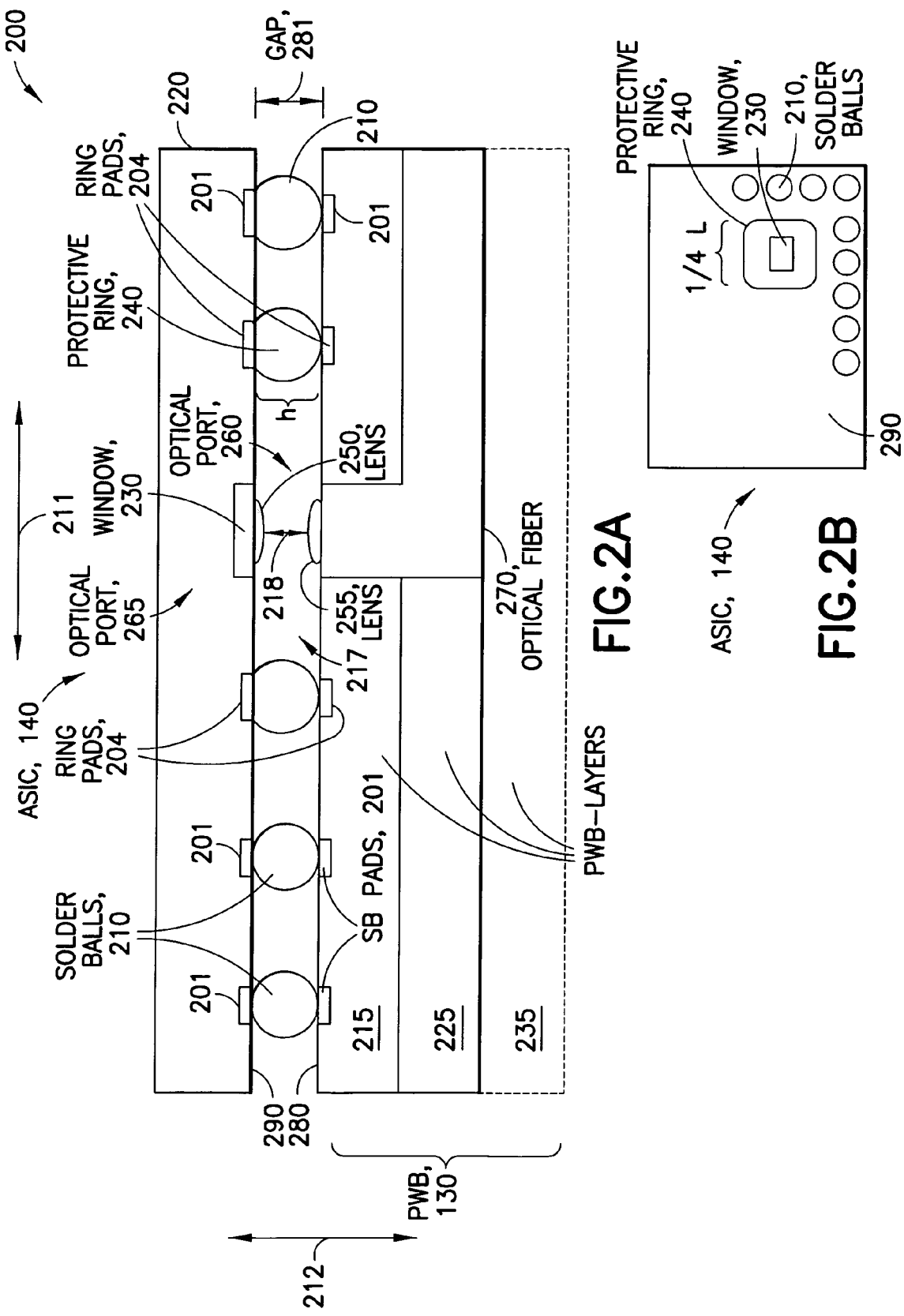
FIG. 2A is a cross-section of the electronic component module shown in FIG. 1B.
FIG. 2B is a bottom view of an application specific integrated circuit (ASIC) of the electronic component module shown in FIG. 1B.

Turning now to FIGS. 2A and 2B, FIG. 2A is a cross-section of a portion of the electronic component module 200 of FIG. 1B. FIG. 2B is a bottom view of ASIC 140 of the electronic component module 200 shown in FIG. 1B. The ASIC 140 comprises a package 220 having a number of solder ball pads 201, an optical port 265 comprising a window and a lens 250, a side 290 and ring pads 204. The PWB 130 comprises PWB layers 215, 225, and 235, an optical fiber 270, and an optical port 260 comprising a lens 255. The PWB layer 215 comprises solder ball pads 201 and ring pads 204. Although only three PWB layers 215 are shown, typical PWB layers 215 comprise one or more signal layers, one or more ground planes, one or more power planes, and insulating layers between each of the signal layers, ground planes, and power planes.

The optical ports 260, 265 are positioned horizontally 211 (e.g., relative to sides 280, 290), typically by positioning the PWB 130 and the ASIC 140 to be at least partially aligned (e.g., in a plane perpendicular to sides 280, 290) so that an optical coupling 218 can occur. It should be noted that each side 280, 290 could be considered to be a surface. The PWB 130 and ASIC 140 are positioned vertically 212 (e.g., using a plan perpendicular to signs 280, 290), typically by placing the ASIC 140 on top of the side 280 of the PWB 130. A gap 281 is formed between the side 280 of the ASIC 140 and the side 290 of the PWB 130. Typically, the ASIC 140 comprises the solder balls 210, which have been bonded to the solder ball pads 201. The ASIC 140 is then positioned to at least partially align (e.g., vertically 212) the solder balls 210 with the solder ball pads 201 on the side 280 of the PWB 130.

In an exemplary embodiment, the ring pads 204 on the side 290 of the ASIC 140 are created by the manufacturer of the ASIC 140. Similarly, the ring pads 204 on the side 280 of the PWB 130 are created by the manufacturer of the PWB 130. In an exemplary embodiment, the protective ring 240 is formed using a material of solder balls that bonded to the ring pads 204 when the PWB 130 and ASIC 140 are put into a reflow oven. In another exemplary embodiment, the protective ring 240 is formed using a material of a soldering paste that is bonded to the ring pads 204 when the PWB 130 and ASIC 140 are put into a reflow oven. In yet another exemplary embodiment, the protective ring 240 is formed using materials comprising a combination of soldering paste and solder balls 210, bonded to the ring pads 204 when the PWB 130 and ASIC 140 are put into a reflow oven. In further embodiments, the protective ring 240 is formed of any material able to surround the optical ports 265, 260.

While bonding of the protective ring 240 to the ring pads 204 is not necessary, bonding is beneficial, as bonding using certain materials can provide increased strength of the mechanical coupling between the PWB 130 and the ASIC 140, increased strength of the electronic component module 200, and improved heat dissipation. It should be noted that the cross-section, of the material of the protective ring 240, perpendicular to the side 280 does not have to have the same area as the cross-section of the solder balls 210 or have the same width of the solder ball pads 201 of the ring pads 204. Strength and heat dissipation needs could define the needed area of the cross-section for the protective ring 240.

An optical port 260, 265 can be any device suitable for communicating (e.g., sending, receiving, or both) information using light as a carrier. Additionally, optical ports 260, 265 may be used solely to passively communicate light so that the information content in the carrier is immaterial. The optical ports 260, 265 shown in FIGS. 2A and 2B are merely exemplary.

As can be seen in FIGS. 2A and 2B, the protective ring 240 surrounds the optical ports 260, 265. The protective ring 240 has a length, L, and a height, H (e.g., determined by gap 281). The protective ring 240 forms a "protected" volume 217. In certain exemplary embodiments of the present invention, the protected volume 217 is filled with one or more substances. It is beneficial if the protective ring 240 has no openings within its length and height. For instance, the protective ring 240 should completely surround the optical ports 260, 265 and fill height H, such that protective ring 240 provides a complete seal around the protected volume 217 (e.g., and optical ports 260, 265). However, some openings might be tolerated, such that the protective ring 240 provides an incomplete seal around the protected volume 217 (e.g., and the optical ports 260,265). This is explained in more detail below.

Figure 3:
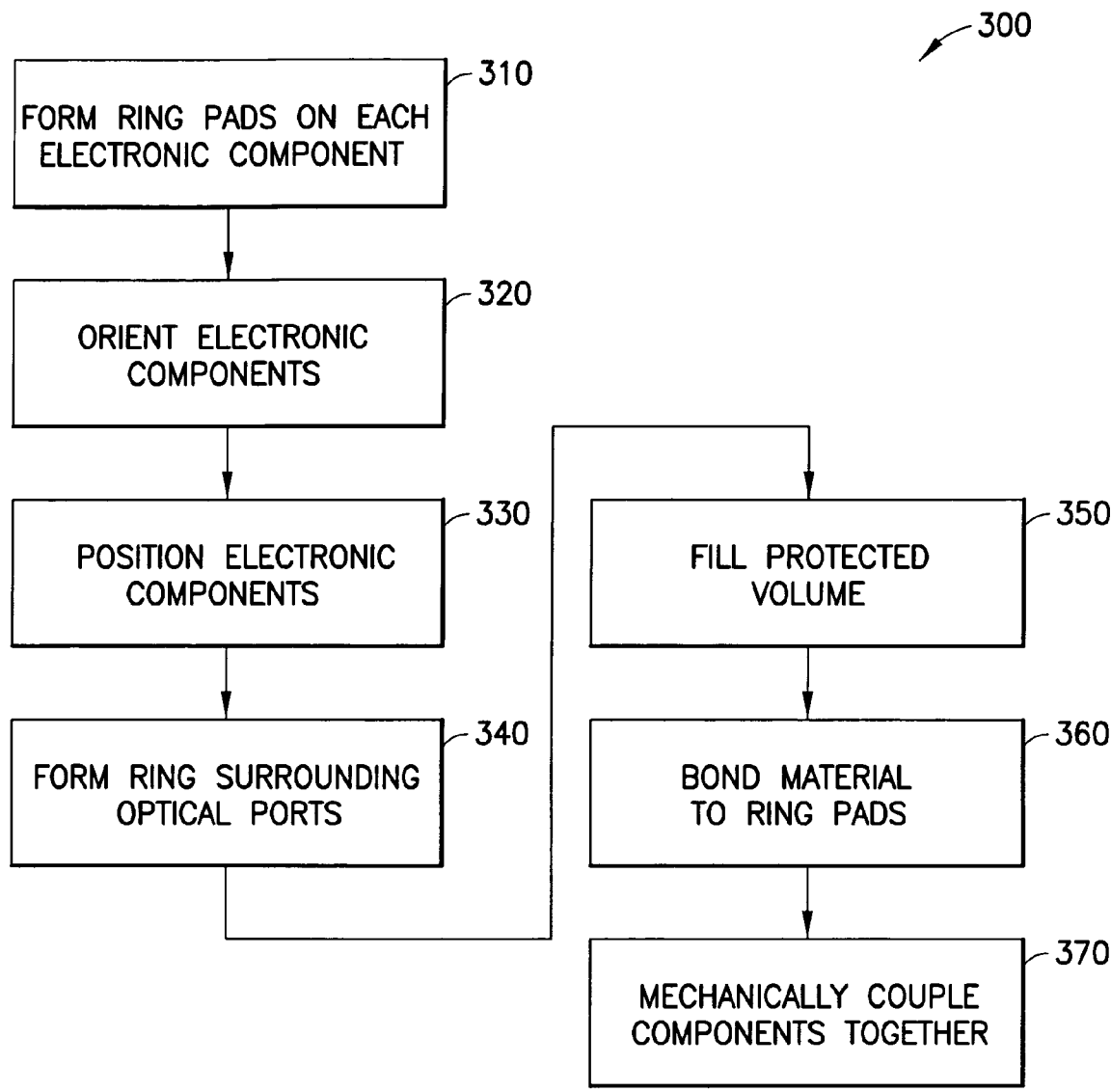
FIG. 3 is a flowchart of an exemplary method for protecting optical coupling between optical ports on electronic components.

Referring now to FIG. 3, a flowchart is shown of an exemplary method 300 for protecting optical coupling between optical ports on electronic components. Method 300 would be performed during manufacturing of the electronic component module 200. In step 310, ring pads 204 are formed on each electronic component. Note that step 310 would typically be performed by the manufacturers of the electronic component. However, the ring pads 204 could be added after manufacturing of the electronic component or even not added at all. In step 320, the electronic components are oriented so that the sides 280, 290 are opposite each other. In step 330, the electronic components are positioned so that the optical ports 260, 265 are at least partially aligned well enough to create an optical coupling 218 between the optical ports 260, 265. Step 330 may also comprise placing one electronic component on top of another electronic component. Alternatively, step 360 (described below) may comprise placing one electronic component on top of another electronic component.

In step 340, a protective ring 217 is formed to surround the optical ports 260, 265 and to fill the gap 281. The material used in the protective ring 217 will typically be one or more of solder balls, soldering paste, tin, and the like commonly used during manufacturing processes of an electronic component module 200. However, any material suitable for surrounding optical ports may be used. Exemplary embodiments described below use adhesives, conductive elastomers, or both, although typically soldering materials (e.g., one or more of solder balls, soldering paste, tin) provide low cost and are easily incorporated into many current manufacturing processes. It is beneficial that the material completely seal (e.g., after step 370 is performed) the protected volume 217, but an incomplete seal such that there are small openings might be tolerated. This also depends on the surrounding conditions into which the electronic component module 200 is to be placed, and the effects of having openings would vary. Impurities and optical leaks would result from an opening but optimal economic results could come from allowing some openings.

One exemplary benefit of completely sealing the protected volume 217 is that crosstalk is prevented between optical ports 260, 265. This affects the price of the optics needed in terms of power levels and manufacturing area air purity requirements (e.g., small dust particles on the optics can be tolerated and corrected for by adding power), as light scattered from dust or deviated from imperfections in optical elements does not affect other optical ports 260, 265. In some cases, the size of the protective ring (or rings) could be optimized (e.g., including surrounding the whole ASIC with a ring) to control local heat dissipation or to balance mechanical loads.

Note that step 340 may be performed in several steps. For instance, half of the protective ring 340 may be formed on the PWB 130 and another half of the protective ring 340 may be formed on the ASIC 140 such that when both the PWB 130 and ASIC 140 are positioned (e.g., in step 330 or step 360), a complete protective ring 240 is formed.

In step 350, the protected volume 217 is optionally filled with one or more substances. For instance, there could be some other substances present to clean the optical surfaces of the optical ports 260, 265 before the protected volume 217 is created (e.g., before step 340), to fill the protected volume 217 with, e.g., an inert gas or to fill the protected volume 217 with an oil to change refractive properties in the optical system. Changing the refractive properties can be important if several optical paths (e.g., optical coupling 218 for two sets of optical ports 260, 265) are placed within one protected volume 217.

In step 360, in an exemplary embodiment the material is bonded to ring pads 204. Bonding in step 360 creates a joint where two substances or separate parts of one substance are brought together so that forces (e.g., molecular forces or atomic level forces or both) keep the substances from separating. Note that step 360 may also comprise placing one electronic component on top of another electronic component. Suitable materials, e.g., solder balls, soldering paste, tin, or some combinations of these can be bonded to the ring pads 204. In step 370, the electronic components are mechanically (e.g., and generally electronically) coupled together. Usually, steps 360 and 370 are performed so that they are combined into a single step. For example, both the electronic components can be put into a reflow oven for a predetermined time at a predetermined temperature, which will bond the material and solder balls 210 to the ring pads 204, solder ball pads 201, respectively. In other embodiments, step 360 is performed separately from step 370. For instance, conductive elastomers typically require some type of compression for bonding the conductive elastomers to the ring pads 204. It should be noted that sometimes an adhesive and a conductive elastomer are used together, e.g., to provide improved bonding of the conductive elastomer to the ring pads 204.

It should be noted that step 340 may, in some embodiments, not provide a complete seal of the protected volume 217 until step 360 and/or step 370 is performed. For example, if solder balls are used in the protective ring 240, the solder balls may not seal until heated in a reflow oven in step 360. Thus, step 340 may overlap with one or more of steps 360 and 370. Additionally, there may be situations where ring pads 204 are not needed. For instance, heat resistant adhesives (e.g., epoxies) might be used that can withstand temperatures in a reflow oven (e.g., step 360 and/or step 370) and that may not use ring pads 204 (e.g., or use ring pads made of materials other than those used for soldering). Then, steps 310 and 360 would generally not be performed.

Note that the steps 310-370 in method 300 may be performed in a number of different orders. As an illustration, a protective ring 240 of soldering paste could be formed on the PWB 130 (step 340). The partially formed protective volume 217 could be filled with an oil (step 350), then the ASIC 140 positioned over the PWB 130 (step 330) so that the optical ports 260, 265 are at least partially aligned well enough to create an optical coupling 218 between the optical ports 260, 265 and to complete the protected volume 217. Then steps 360 and 370 could be performed to bond the soldering paste to the ring pads 204 and to mechanically couple (e.g., using the solder balls 210 and solder ball pads 201) the PWB 130 and the ASIC 140.

Figure 4B:
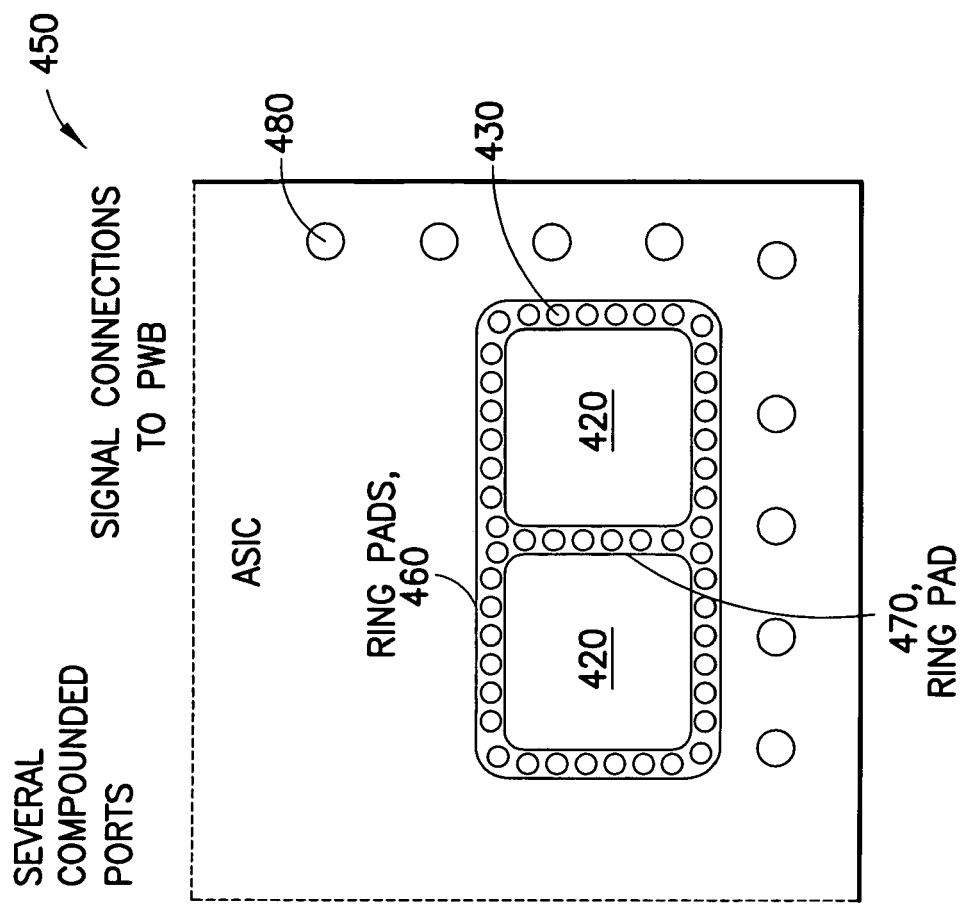
FIGS. 4A and 4B are bottom views of portions of electronic components.
Figure 4A:
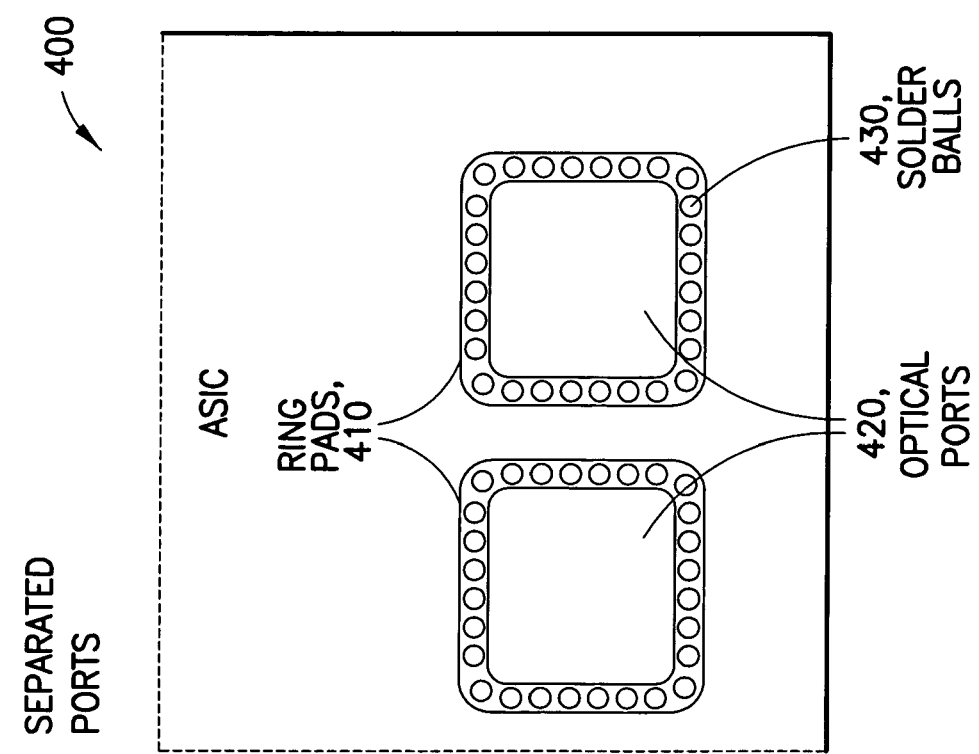

Referring now to FIG. 4A, a bottom view is shown of a portion 400 of an electronic component (e.g., an ASIC). Portion 400 comprises two ring pads 410, which have a number of solder balls 430. The solder balls 430 are shown as being formed surrounding the optical ports 420 and will, after step 360 of FIG. 6, seal the protected volume 217. In FIG. 4A, the optical ports 420 are separated by a larger distance than that shown in FIG. 4B. In FIG. 4B, another bottom view is shown of a portion 450 of an electronic component (e.g., an ASIC). The ring pads 460, 470 this time surround both the optical ports 420, and the ring pad 470 is a shared portion of pads (e.g., pads 410) used to separate both the optical ports 420. Also shown are signal connections 480 to the PWB, where the signal connections are typically solder balls but may be any other connection means.

Figure 5:
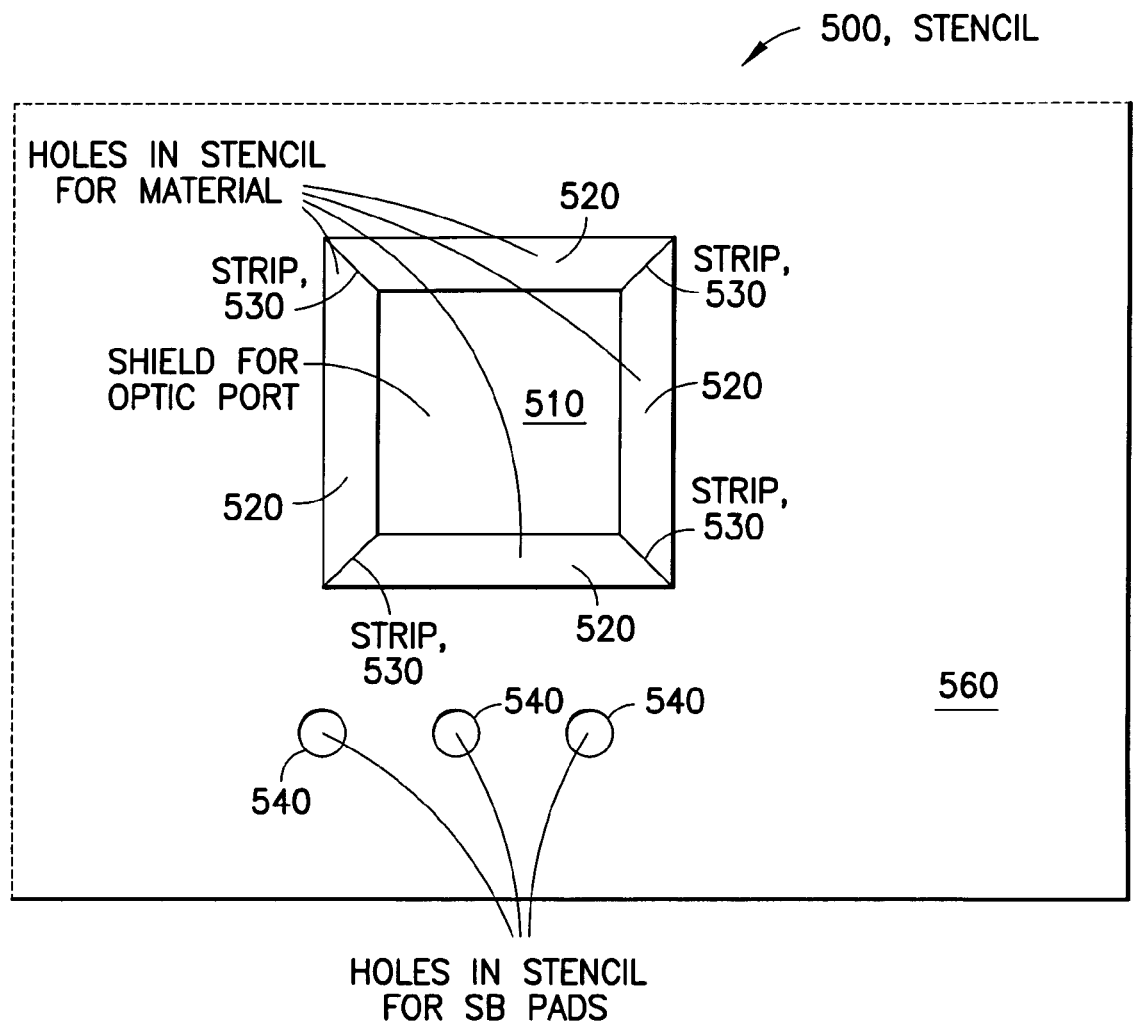
FIG. 5 is a diagram of an exemplary stencil used during application of material for forming a protective ring surrounding an optical port.

Turning now to FIG. 5, a diagram is shown of an exemplary stencil 500 used during application of material for forming a protective ring 240 surrounding an optical port. Stencil 500 is used to place soldering paste (e.g., during step 350 of FIG. 3) on surfaces (e.g., sides 280, 290) of electronic components (e.g., PWB 130 and ASIC 140). Stencil 500 comprises a shield 510 for an optical port, a body 560, holes 520 and 540, and strips 530. The strips 530 are used to hold the shield 510 in place. Holes 520 are used to form material for a protective ring, while holes 540 are used to for material for solder ball pads. The holes 520 are designed so that soldering paste pushed through the holes 520 would at least partially align with ring pads 204. The shield 510 prevents soldering paste from covering an optical port.

It should be noted that the "rings" (e.g., protective ring 240) formed herein need not be in any particular shape. What is important is that the material for a protective ring is formed to surround the optical port. A path taken by the material could be very circuitous if desired.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the present invention, and not in limitation thereof.

What is claimed is:

1. A method for protecting optical coupling between optical ports on opposing electronic components, comprising:
   orienting first and second electronic components, each of the first and second components having a side comprising an optical port, so that the sides are opposite each other;
   positioning the first and second electronic components so as to enable optical coupling between the optical ports;
   forming, using at least one material, a ring that surrounds the optical ports and fills a gap between the sides of the first and second components; and
   mechanically coupling the first and second components together.

2. The method of claim 1, wherein fanning further comprises sealing a protected volume defined by the ring and the sides of the first and second electronic components.

3. The method of claim 2, wherein sealing and mechanically coupling overlap.

4. The method of claim 1, wherein the at least one material comprises at least one of an adhesive and a conductive elastomer.

5. A method for protecting optical coupling between optical ports on electronic components, comprising:
   providing first and second electronic components, each of the first and second electronic components having a side comprising an optical port and comprising a pad formed to surround the optical port;
   orienting the first and second electronic components so that the sides are opposite each other;
   positioning the first and second electronic components, the positioning performed so that the pad formed to surround the optical port on the first electronic component is positioned to at least partially align with the pad formed to surround the optical port on the second electronic component;
   placing at least one material in contact with at least a portion of each of the pads; and
   bonding the at least one material to the pads, wherein the at least one material fills a gap between the sides after placing and bonding.

6. The method of claim 5, wherein the at least one material comprises at least one of solder balls, solder paste, and tin.

7. The method of claim 5, wherein bonding further comprises mechanically coupling the first and second components together.

8. The method of claim 7, wherein bonding further comprises heating the first and second electronic components in a reflow oven for a predetermined time.

9. The method of claim 5, wherein The at least one material comprises an adhesive.

10. The method of claim 5, wherein placing at least one material further comprises placing soldering paste through a plurality of holes in a stencil placed over a side of a given one of the electronic components, the plurality of holes defined so that the soldering paste contacts at least a portion of a corresponding pad on the given electronic component.

11. The method of claim 10, wherein placing at least one material further comprises placing soldering paste through a plurality of holes in a stencil placed over a side of another of the electronic components, the plurality of boles defined so that the soldering paste contacts at least a portion of a corresponding pad on the other electronic component.

12. The method of claim 5, wherein the first electronic component comprises an integrated circuit and wherein the second electronic component comprises a printed wiring board.

13. The method of claim 5, wherein placing at least one material further comprises placing the at least one material in contact with a portion of the pad on the side of the first electronic component and placing the at leapt one material in contact with a portion of the pad on the side of the second electronic component.

14. The method of claim 5, wherein the step of placing at least one material creates a volume between sides of the first and second electronic components and a ring formed by the at least one material and wherein the method further comprises filling the volume with one or more substances.

15. The method of claim 14, wherein the at least one substance comprises one or more of an inert gas and an oil.

16. The method of claim 5, further comprising forming the pad on the first electronic component.

17. The method of claim 5, wherein:
each of the first and second electronic components comprises two optical ports;
positioning is performed so that a first pad formed to surround a first optical port on the first electronic component is positioned to at least partially align with a first pad formed to surround a first optical port on the second electronic component;
positioning is performed so that a second pad formed to surround a second optical port on the first electronic component is positioned to at least partially align with a second pad formed to surround a second optical port on the second electronic component; and
placing further comprises placing at least one material in contact with at least a portion of each of the first pads and placing at least one material in contact with at least a portion of each of the second pads.

18. The method of claim 17, wherein each of die first and second pads on each of the electronic component has a shared portion.

19. An apparatus comprising:
a first electronic component comprising a first optical part on a side of the first electronic component;
a second electronic component mechanically coupled to the first electronic component and comprising a second optical port on a side of the second electronic component, the sides of the first and second electronic components opposite each other, the first and second optical ports able to optically couple; and
a ring between the sides and surrounding the first and second optical ports, the ring comprising at least one material.

20. The apparatus of claim 19, wherein the at least one material comprises one or more of the following: solder and tin.

21. The apparatus of claim 19, wherein the at least one material comprises at least one of an adhesive and a conductive elastomer.

22. The apparatus of claim 19, wherein the ring has no openings.

23. The apparatus of claim 19, wherein the ring has one or more openings.

24. The apparatus of claim 19, wherein the ring creates a volume between sides of the first and second electronic components and the volume is filled with at least one substance.

25. The apparatus of claim 24, wherein the at least one substance comprises one a more of an inert gas or an oil.

26. An electronic device comprising:
a plurality of electronic components, a first of the plurality of electronic components having a side comprising a first optical port, a second of the plurality of electronic components having a side comprising a second optical port, the sides of the first and second electronic components opposite each other, the first and second optical ports able to optically couple, and the sides of the first and second electronic components mechanically coupled together;
a ring between the sides and surrounding the optical ports, the ring comprising at least one material tat fills a gap between the sides;
a keypad coupled to at least one of the plurality of the electronic components; and
a screen coupled to at least one of the plurality of the electronic components.

27. The electronic device of claim 26, wherein the at least one material comprises one or more of the following: solder, tin, an adhesive, and a conductive elastomer.

28. A method for protecting optical coupling between optical ports on electronic components, comprising:
providing first and second electronic components, each of the first and second electronic components having a side comprising an optical port and comprising a pad formed in a ring to surround a respective optical port, and wherein at least one of the pads has at least one material in contact with the at least one pad;
orienting the first and second electronic components so that the sides are opposite each other and so that a gap exists between the sides;
positioning the first and second electronic components, the positioning performed so that the pad fanned to surround the optical port on the first electronic component is positioned to at least partially align with the pad formed to surround the optical port on the second electronic component and wherein the positioning is performed to provide optical coupling between the optical ports; and
bonding the at lease one material to the pads, wherein the at least one material fills the gap between the sides after bonding.

29. The method of claim 28, wherein the at least one material comprises at least one of solder balls, solder paste, and tin.

* * * * *

UNITED STATES PATENT AND TRADEMARK OFFICE
CERTIFICATE OF CORRECTION

| | | |
|---|---|---|
| PATENT NO. | : 7,324,720 B2 | Page 1 of 1 |
| APPLICATION NO. | : 11/067089 | |
| DATED | : January 29, 2008 | |
| INVENTOR(S) | : Jari Pistemaa and Niko Porjo | |

It is certified that error appears in the above-identified patent and that said Letters Patent is hereby corrected as shown below:

In column 9, Claim 13, line 8, delete "leapt" and replace with --least--.

In column 9, Claim 18, line 37, delete "die" and replace with --the--.

In column 9, Claim 19, line 41, delete "part" and replace with --port--.

In column 10, Claim 26, line 22, delete "tat" and replace with --that--.

In column 10, Claim 28, line 43, delete "fanned" and replace with --formed--.

In column 10, Claim 28, line 50, delete "lease" and replace with --least--.

Signed and Sealed this

Tenth Day of June, 2008

JON W. DUDAS
*Director of the United States Patent and Trademark Office*